(12) United States Patent
Kim (10) Patent No.: US 8,462,280 B2
(45) Date of Patent: Jun. 11, 2013

(54) LIQUID CRYSTAL LENS ELECTRICALLY DRIVEN AND STEREOSCOPIC DISPLAY DEVICE THEREOF

(75) Inventor: Sung Woo Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 252 days.

(21) Appl. No.: 12/957,716

(22) Filed: Dec. 1, 2010

(65) Prior Publication Data

US 2011/0157497 A1    Jun. 30, 2011

(30) Foreign Application Priority Data

Dec. 31, 2009  (KR) .................. 10-2009-0135689

(51) Int. Cl.
*G02F 1/1333* (2006.01)
*G02F 1/1335* (2006.01)

(52) U.S. Cl.
USPC .............. 349/33; 349/15; 349/16; 349/57; 349/95

(58) Field of Classification Search
USPC .............. 349/33, 34, 95, 15, 16, 56, 57, 139, 349/141, 142, 143
See application file for complete search history.

(56) References Cited

U.S. PATENT DOCUMENTS

| | | | | |
|---|---|---|---|---|
| 6,049,364 A | * | 4/2000 | Takahara et al. | 349/10 |
| 6,144,353 A | * | 11/2000 | McKnight | 345/94 |
| 2008/0013003 A1 | * | 1/2008 | Soh | 349/15 |
| 2008/0211978 A1 | * | 9/2008 | Hikmet et al. | 349/33 |

* cited by examiner

*Primary Examiner* — Brian M. Healy
*Assistant Examiner* — Mary El Shammaa
(74) *Attorney, Agent, or Firm* — Morgan, Lewis & Bockius LLP

(57) ABSTRACT

The present invention relates to a liquid crystal lens electrically driven in which micro division electrodes are applied both to upper and lower substrates, and a voltage condition is varied with a number of views of a stereo 3D image display for enabling display of a plurality of views and a stereoscopic display device thereof.

9 Claims, 4 Drawing Sheets

LIQUID CRYSTAL LENS ELECTRICALLY DRIVEN AND STEREOSCOPIC DISPLAY DEVICE THEREOF

CROSS REFERENCE TO RELATED APPLICATION

This application claims the benefit of the Patent Korean Application No. 10-2009-135689, filed on Dec. 31, 2009, which is hereby incorporated by reference as if fully set forth herein.

BACKGROUND OF THE DISCLOSURE

1. Field of the Disclosure

The present invention relates to liquid crystal lens electrically driven, and more particularly, to a liquid crystal lens electrically driven in which micro division electrodes are applied both to upper and lower substrates, and a voltage condition is varied with a number of views of a stereo 3D image display for enabling display of a plurality of views and a stereoscopic display device thereof.

2. Discussion of the Related Art

It is foreseen that services to be realized for making faster information transmission to be constructed based on a super fast communication network will develop from the present simple "hearing and speaking" services such as telephone services to "watching and hearing" multimedia type services centered on digital terminals which process characters, voices and picture at a high speed, and finally to super spatial realistic three dimensional stereoscopic information communication services in which "watching, feeling and enjoying realistically and stereoscopically transcending time and space".

In general, a stereo 3D image which expresses three dimension is made by a principle of a stereoscopic view angle through the two eyes in which a left eye and a right eye see images slightly different from each other owing to a difference of positions of the two eyes as the two eyes have a difference of views, i.e., the two eyes are about 65 mm spaced from each other. The difference of images caused by the difference of the two eyes is called as binocular disparity. A three dimensional stereoscopic display device makes a user to have a stereoscopic feeling owing to the binocular disparity by making the left eye to see an image only on the left eye and the right eye to see an image only on the right eye by using the binocular disparity.

That is, the left/right eyes are made to see two dimensional images different from each other respectively, and if the two images are transmitted to a brain through a retina, the brain combines the two images accurately to produce a sense of depth and a sense of reality of an original three dimensional image. Such a capability is in general called as stereography, and a device having the stereography applied thereto is called as the stereoscopic display device.

In the meantime, the stereoscopic display device can be sorted depending on elements of the lens which implement 3D (3-dimension). As an example, a system in which the lens has a liquid crystal layer is called as a liquid crystal lens electrically driven system.

In general, a liquid crystal display device is provided with two electrodes facing each other, and a liquid crystal layer disposed therebetween, in which liquid crystal molecules are driven by an electric field formed by application of a voltage to the two electrodes. The liquid crystal molecules have a polarizing characteristic and an optical anisotropy. The polarizing characteristic is a characteristic in which, if the liquid crystal molecule is placed in an electric field, electric charge in the liquid crystal molecule is driven to opposite sides of the liquid crystal molecule varying a molecular arrangement direction with the electric field, and the optical anisotropy is variation of a path or a polarization state of light from the liquid crystal layer with a direction of incident of a light or a state of polarization owing to a long and thin structure of the liquid crystal molecule or the molecular arrangement direction described before.

According to this, the liquid crystal layer varies transmissivity with the voltage applied to the two electrodes, and an image can be displayed by varying the difference with pixels.

Recently, a liquid crystal lens electrically driven has been suggested in which the liquid crystal layer is made to serve as a lens by using such characteristics of the liquid crystal molecule.

That is, the lens controls paths of incident lights to vary with positions of the paths by using a difference of refractive indices between a substance of the lens and the air. If voltages varied with positions of electrodes are applied to the liquid crystal layer, to form electric field to drive the liquid crystal layer, the lights incident on the liquid crystal layer sense phases varied with positions of the incident, enabling the liquid crystal layer to control the paths of the incident lights, like an actual lens.

A related art liquid crystal lens electrically driven will be described with reference to the attached drawings.

Figure 1:
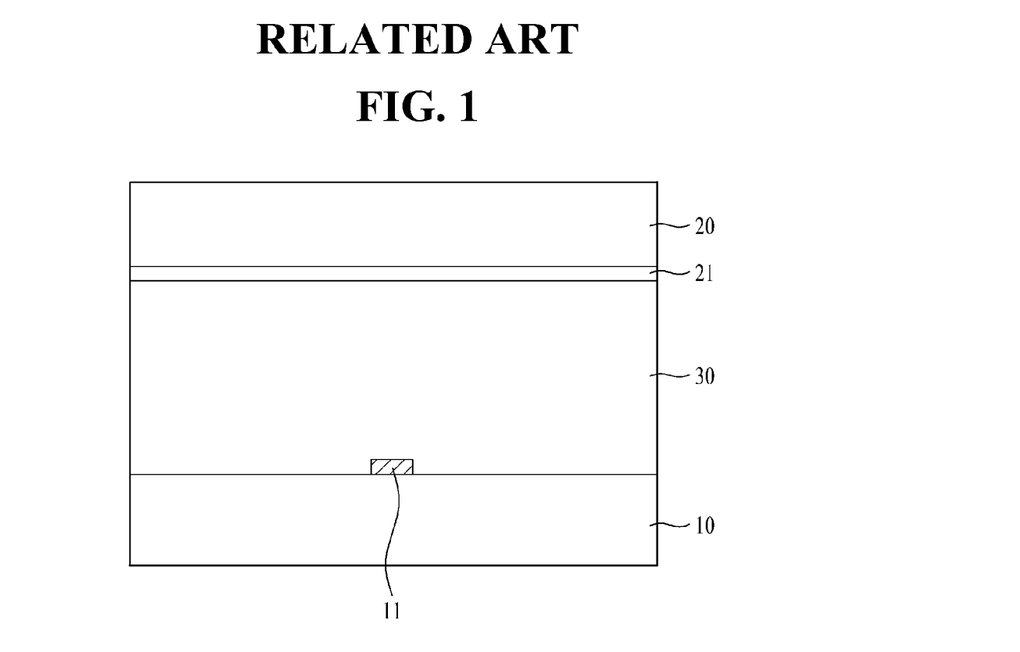
FIG. 1 illustrates a section of a related art liquid crystal lens electrically driven.
Figure 2:
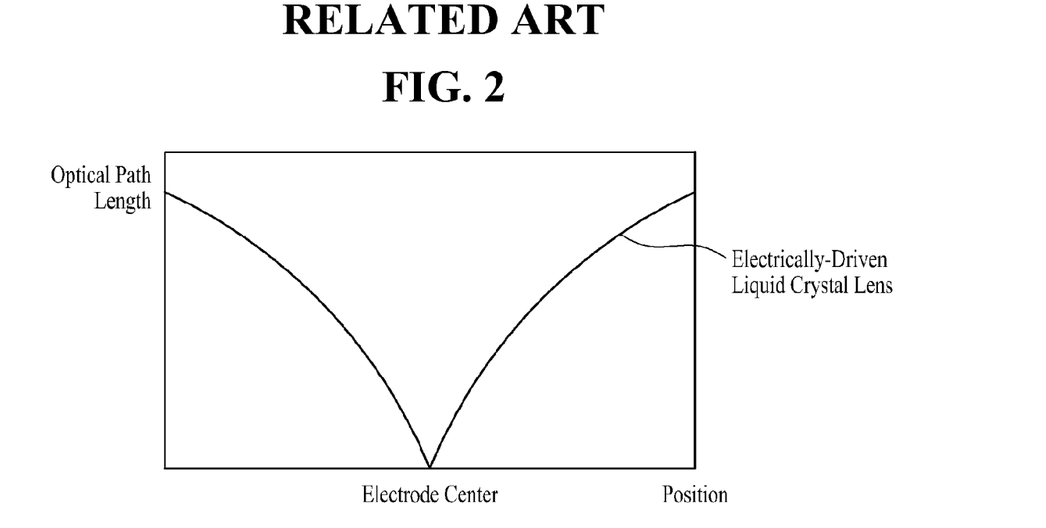
FIG. 2 illustrates a diagram showing a potential distribution after application of a voltage at the time of formation of the liquid crystal lens electrically driven in FIG. 1.

FIG. 1 illustrates a section of a related art liquid crystal lens electrically driven, and FIG. 2 illustrates a diagram showing a potential distribution after application of a voltage at the time of formation of the liquid crystal lens electrically driven in FIG. 1.

Referring to FIG. 1, the related art liquid crystal lens electrically driven is provided with first and second substrates 10 and 20 facing each other, and a liquid crystal layer formed between the first and second substrates 10 and 20.

The first substrate 10 has first electrodes 11 at first intervals formed thereon. Between adjacent first electrodes 11, a distance between a center of a first electrode 11 on one side to a center of the first electrode on the other side is called as a pitch, and identical patterns (the first electrodes) are formed repeatedly at fixed intervals of the pitch.

The second substrate 20 over and facing the first substrate 10 has a second electrode 21 formed on an entire surface thereof.

The first and second electrodes 11 and 21 are formed of a transparent metal. In a space between the first and second electrodes 11 and 21, the liquid crystal layer 30 is formed, and the liquid crystals of the liquid crystal layer 30 have a parabolic potential surface owing to characteristics of the liquid crystal molecules reactive to intensity and distribution of the electric field, showing a phase distribution similar to the liquid crystal lens electrically driven in FIG. 2.

The liquid crystal lens electrically driven, formed under the condition that a high voltage is applied to the first electrode 11 and the second electrode 21 is grounded, forms the strongest vertical electric field at a center of the first electrode 11 which becomes the weaker as the lens goes the far from the first electrode 11 the more. Accordingly, if the liquid crystal molecules of the liquid crystal layer 30 has a positive dielectric anisotropy, the liquid crystal molecules becomes to have an arrangement according to the electric field in which the liquid crystal molecules are upright at the center of the first electrode 11, and tilted the more close to horizontal direction as the lens goes far from the first electrode 11 the more. Therefore, referring to FIG. 2, in view of transmission of the light, an optical path is short at the center of the first electrode 11 and the optical path becomes the longer as the lens goes far from the first electrode 11 the more. If above is expressed in the phase surface, the liquid crystal lens electrically driven becomes to have an optical transmission effect which is similar to a lens having a parabolic surface.

In this instance, the second electrode 21 induces behavior of the liquid crystal lens electrically driven, making a refractive index the light senses on the whole to be a spatial parabolic function and the first electrode 11 to form an edge region of the lens.

In this instance, the first electrode 11 has a voltage more or less higher than the second electrode 21, such that, as shown in FIG. 2, a potential difference takes place between the first electrode 11 and the second electrode 21, particularly causing a sharp side electric field at a portion of the first electrode 11. According to this, the liquid crystals form, not a moderate distribution, but a more or less distorted shape of distribution, failing to form the spatial parabolic surface of the refractive index, or move very sensitive to the voltage.

The liquid crystal lens electrically driven can be obtained by providing the liquid crystals, forming electrodes on facing substrates with the liquid crystals disposed therebetween, and applying a voltage thereto, without providing a parabolic surfaced lens, physically.

However, the related art liquid crystal lens electrically driven has the following problems.

First, the first electrode formed at a very small portion of the lens region on the lower substrate causes to form an electric field between the lens edge region opposite to the electrode and the lens center region which is far from the lens edge region, not moderately, but to have a sharp side surface electric field to form a more or less distorted liquid crystal lens electrically driven. Particularly, since an electrode having a high voltage applied thereto is limited as the pitch of the lens regions increases the more, making the electric field applied to the lens region between the electrode having a high voltage applied thereto and the facing substrate inadequate, formation of the liquid crystal lens electrically driven having a moderate parabolic surface which has an effect identical to a lens becomes difficult.

Second, as a size of the device becomes the larger, the control of the liquid crystal arrangement becomes the more difficult by using the electric field since the lens center region which is far from the edge region of the lens region at which the electrode having the high voltage applied thereto exists has almost no effect of the electric field.

Third, the liquid crystal lens electrically driven produces only two views in one lens cell. That is, two pixels of the lower display panel are arranged within one pitch at the lens region, forming lenses limited to each pitch on a side the electrode is patterned, to require to increase a number of views of the liquid crystal lens electrically driven within one liquid crystal lens electrically driven for making a variety of display, and changing a number of views.

SUMMARY OF THE DISCLOSURE

Accordingly, the present invention is directed to a liquid crystal lens electrically driven and a stereoscopic display device thereof.

An object of the present invention is to provide a liquid crystal lens electrically driven in which micro division electrodes are applied both to upper and lower substrates, and a voltage condition is varied with a number of views of a stereo 3D image display for enabling display of a plurality of views and a stereoscopic display device thereof.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal lens electrically driven includes a first and second substrates arranged to face each other to have a plurality of lens regions with pitches different from each other, a plurality of first electrodes respectively formed at first lens regions of the first substrate in one direction, a second electrode respectively formed at a second lens regions of the second substrate in one direction, a voltage source for generating a first voltage group of voltages different from one another to be applied to the first electrodes positioned from a center to an edge portion of the first lens region, a second voltage group of voltages different from one another to be applied to the second electrodes positioned from a center to an edge portion of the second lens region, and a common voltage to be applied to the first voltage group or the second voltage group, and a liquid crystal layer filled between the first substrate and the second substrate.

In this instance, at the time the lens at the first lens regions are produced, the voltage source applies the first voltage group to the first electrodes and the common voltage to the second electrodes.

At the time the lens at the second lens regions are produced, the voltage source applies the second voltage group to the second electrodes and the common voltage to the first electrodes.

Preferably, the first voltage group are voltages which become the higher as the first region goes from the center to the edge portion to be applied to the first electrodes, and the second voltage group are the voltages which become the higher as the second lens region goes from a peak point of a sub-region to a boundary of the sub-region to be applied to the second electrodes such that each of a plurality of the sub-regions of the second lens region has the peak point. In this case, preferably the second lens region has a pitch greater than a pitch of the first lens region.

The first and second electrodes are transparent electrodes formed in the same direction.

In another aspect of the present invention, a stereoscopic display device includes the liquid crystal lens electrically driven described above, and a display panel positioned on a lower side of the liquid crystal lens electrically driven for transmission of a two dimensional image.

The two dimensional display is performed by cutting off the voltages applied to the first and second electrodes through the voltage source, and three dimensional display is performed by applying voltages different from one another to the first electrodes and the second electrodes through the voltage source.

Preferably, the first lens region has a pitch equivalent to two sub-pixels of the display panel and the second lens region has a pitch equivalent to three or more than three sub-pixels. In this case, a number of sub-regions of the second lens region are fixed in proportion to square of a value obtained by dividing the pitch of the second lens region by the pitch of the first lens region.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

Since control of a micro profile is difficult if a liquid crystal lens electrically driven is formed to have single electrode at a lens region, in order to solve this problem, a system is suggested in which a micro division structure is applied to the single lens region, and different voltages are applied thereto.

Figure 3:
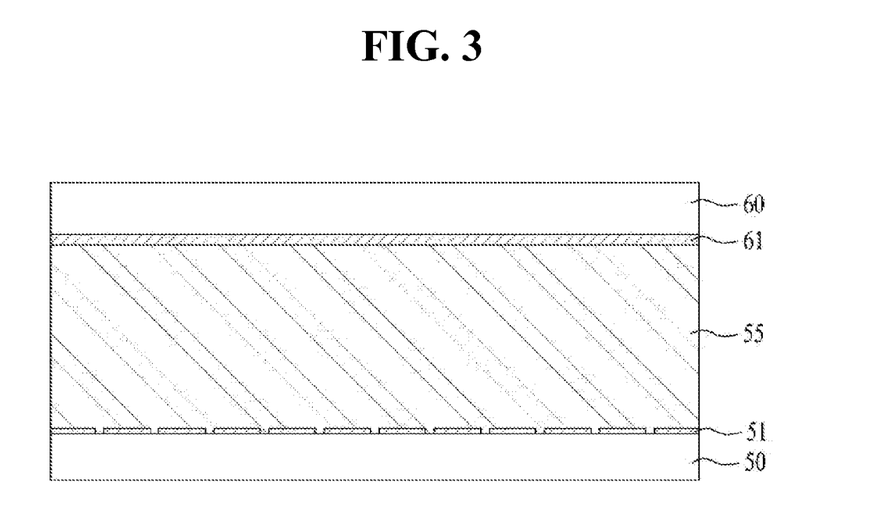
FIG. 3 illustrates a section of a micro division electrode structure.

FIG. 3 illustrates a section of a micro division electrode structure.

Referring to FIG. 3, the micro division structure includes a first and second substrates 50 and 60 arranged to face each other having a plurality of lens regions defined opposite to each other, a plurality of first electrodes 51 formed spaced from one another on the lens regions of the first substrate 50 respectively, a second electrode 61 formed on an entire surface of the second substrate 60, voltage sources V0, V1, V2, - - - , Vmax for applying voltages different from one another to sub-regions of the plurality of first electrodes at the lens regions respectively, and a constant voltage (0V or a fixed voltage) to the second electrode, and a liquid crystal layer 55 filled between the first substrate 50 and the second substrate 60.

In this instance, the first electrodes 51 have the voltages applied thereto through metal lines 65 for applying voltages V0~Vmax different from one another respectively and contact holes 70.

In this instance, the liquid crystal lens electrically driven of the present invention having a function in which two dimensional image signals are forwarded as a stereo 3D image signal according to a profile of a lens surface, and positioned on the display panel (not shown) which produces two dimensional signal and serves to forward the stereo 3D image signal or the two dimensional image signal as it is selectively depending on application of a voltage. That is, by using light transmissivity characteristic, the two dimensional image can be displayed at the time of no voltage application and the stereo 3D image signal can be displayed when the voltage is applied, thereby enabling a switching function.

The first electrodes 51 and the second electrode 61 are formed of a transparent metal, for preventing loss of transmissivity at portions where the electrodes are positioned.

In this instance, if one parabolic liquid crystal lens electrically driven is formed matched to the lens region, a first voltage V0 substantially equivalent to a threshold voltage is applied to a center of the lens region, a (n)th voltage Vmax which is the highest is applied to the first electrode 51 positioned at the edge portion of the lens regions. In this case, the voltages applied to the first electrodes 51 positioned at the center of the lens region and the edge portion of the lens region respectively are voltages which becomes the higher as the lens region goes far from the center of the lens region the more between the first voltage V0 and the (n)th voltage Vmax. In the meantime, if the voltages are applied to the plurality of first electrodes 51 respectively, the constant voltage, such as the ground voltage or the threshold voltage, is applied to the second electrode 61 to form a vertical electric field between the first electrodes 51 and the second electrode 61.

However, since the micro division electrode structure can be expressed only one view number, there has been a problem in that a stereoscopic display is limited in a particular direction.

Figure 4:
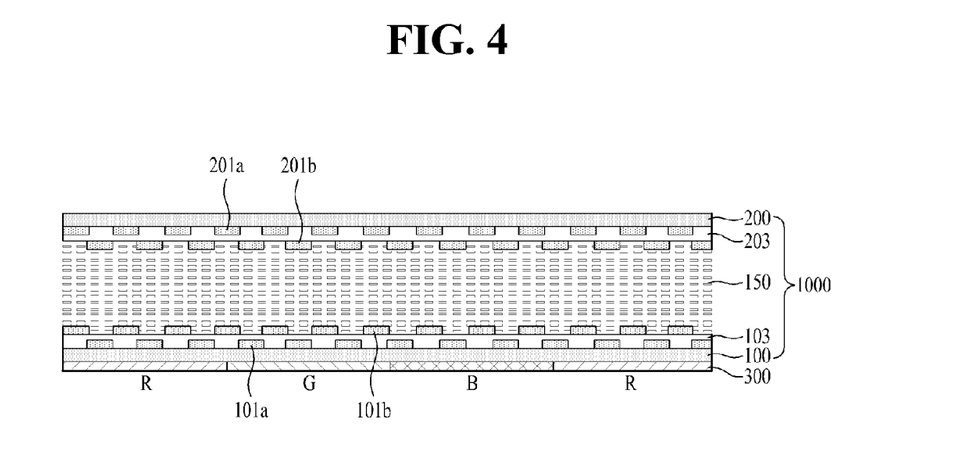
FIG. 4 illustrates a section of a liquid crystal lens electrically driven in accordance with a preferred embodiment of the present invention.

Referring to FIG. 4, the liquid crystal lens electrically driven 1000 of the present invention includes first and second substrates 100 and 200 arranged to face each other having a plurality of first and second lens regions L1 and L2 with pitches different from each other respectively, a plurality of first electrodes 101a and 101b formed on the first substrate 100 in one direction within the first lens regions respectively, a plurality of second electrodes 201a and 201b formed on the second substrate 200 in one direction within the second lens regions respectively, a first voltage group of voltages different from one another for applying to the first electrodes 101a and 101b positioned from a center to an edge portion of the first lens region, a second voltage group of voltages different from one another for applying to the second electrodes 201a and 201b positioned from a center to an edge portion of the second lens region, a voltage source VS for generating a common voltage to be applied to the first electrodes or the second electrodes, and a liquid crystal layer 150 filled between the first substrate and the second substrate.

At the time the lenses at the first lens regions are activated, the voltage source VS applies the first voltage group to the first electrodes 101a and 101b, and a common voltage Vcom to the second electrodes 201a and 201b. In this instance, the common voltage may be 0V, a constant voltage having a fixed level, or an AC voltage. In any case the constant voltage is lower than the voltages applied to the first electrodes 101a and 101b for forming vertical electric fields opposite thereto.

At the time the lenses at the second lens regions are activated, the voltage source VS applies the second voltage group to the second electrodes 201a and 201b, and a common voltage Vcom to the first electrodes 101a and 101b. In this instance, as described before, the common voltage applied to the first electrodes may be 0V, a constant voltage having a fixed level, or an AC voltage. In any case the constant voltage is lower than the voltages applied to the second electrodes 201*a* and 201*b*.

The first voltage group is the voltages which becomes the higher as the first lens region L1 goes from the center to the edge portion the more applied to the first electrodes positioned from the center to the edge portion of the first lens region L1. In this case, when the first voltage group is applied to the first electrode 101*a* and 101*b*, and the common voltage is applied to the second electrodes 201*a* and 201*b*, for an example, two sub-pixels on a side of the display panel in a transverse direction of the first lens region L correspond, to produce a lens of 2 views.

The second voltage group are the voltages which become the higher as the second lens region L2 goes from a peak point of a sub-region to a boundary of the sub-region to be applied to the second electrodes such that each of a plurality of the sub-regions of the second lens region L2 has the peak point, to produce the lens similar to a kind of Fresnel lens. As shown, this is a case when the pitches of the second lens region L2 is greater than the first lens region L1. As shown, the first lens region shows two views and the second lens region L2 shows four views.

The Fresnel lens is produced on a lens region side having greater pitches for reducing a cell gap (a thickness of the liquid crystal layer) because the cell gap can vary with the variation of a number of views. Since it is a trend that the cell gap becomes greater in square of a number of views, taking this into account, the Fresnel lens is used to a side having a greater number of views for reducing a height of the lens.

In the meantime, in the liquid crystal lens electrically driven 1000 of the present invention, by making voltage conditions to be applied to the first and second electrodes different from one another, views different from each other are produced by using one liquid crystal lens electrically driven 1000. In this case, it is required that a backside distance of the lenses of different number of views is the same with a thickness of the liquid crystal layer, and it is required to follow conditions below.

That is, the backside distance is required to follow an equation 1, and the cell gap thickness is required to follow an equation 2.

$$f_1 = D * P_{Lens}/(N*E) \quad (1)$$

Where, $f_1$ denotes the backside distance (a distance between the lens and the display panel), D denotes a 3D watching distance, $P_{lens}$ denotes a pitch of the lens region, N denotes a number of views, E denotes a distance between two eyes (about 65 mm). In this case, since, if a number of views increases, the pitch also increases, the backside distance f1 is constant.

Opposite to this, like d, since the cell gap d increases in square of a number of views, the present invention sets a number of the sub-regions taking an extent of increase of a number of views on a side a number of views are greater relatively.

$$d = \frac{N^2 * E * P_{LCD}}{8D * \Delta n} \quad (2)$$

Referring to FIG. 4, it is preferable that a number of sub-regions of the second lens region are fixed in proportion to square of a value obtained by dividing the pitch of the second lens region by the pitch of the first lens region.

A number of views of a lens applied to an actual design, a sag (a height of the lens to be formed) of a general liquid crystal lens electrically driven according to number of views, a lens sag in production of the Fresnel lens from the liquid crystal lens electrically driven, and a required cell gap and backside distance of the liquid crystal layer will be described with reference to table 1 below.

The following designs show examples of 4.3" landscape type (a panel long in a width direction) liquid crystal lens electrically driven cells and 4.0" portrait type (a panel long in a height direction) liquid crystal lens electrically driven cells.

TABLE 1

| model | Lens tilting | number of views | Lens pitch (μm) | Normal lens sag (μm) | Fresnel lens sag (μm) | Cell gap (μm) | Backside distance (μm) |
|---|---|---|---|---|---|---|---|
| 4.3" landscape | Stripe | 2 | 73 | 12 | | 15 | 307 |
| | | 4 | 156 | 46 | 13 (1/4F) | 16 | 311 |
| | Slanted | 4 | 73 | 11 | | 15 | 311 |
| 4.0" portrait | Stripe | 2 | 216 | 31 | 16 (1/2F) | 20 | 337 |
| | | 4 | 431 | 126 | 25 (1/4F) | 27 | 399 |
| | Slanted | 4 | 216 | 31 | 16 (1/2F) | 20 | 375 |

In above designs, both a slanted type lens which has a tilting angle to the sub-pixel and a stripe type lens which is arranged in the same direction are applied to 4 views. In a case of 2 views, design of the stripe type lens is applied. Since the 2 views have a small number of views, the Fresnel lens is not applied, but the Fresnel lens is applied only to the 4 views in an intention for reducing thickness of the liquid crystal layer.

As can be known from above experiment, it can be known that the 4.3" landscape types are within almost similar range with the backside distances of 307~311 μm and the cell gaps of the liquid crystal layer of 15~16 μm and the 4.0" portrait types are within almost similar range with the backside distances of 875~899 μm and the cell gaps of the liquid crystal layer of 20~27 μm. If the cell gaps are different, if the thickness of the liquid crystal layer is set according to a greater cell gap, the lens with a small cell gap will come within a range of thickness of a thick liquid crystal layer, thereby causing no problem.

Moreover, a deviation of the backside distance in a range of 20 μm, which appears within an error range that can be caused by a slight movement of the watcher, the user can not perceive such a range of deviation. It can be foreseen that shifting between the 2 (two) views and the 4 (four) views is possible from a result of above table.

The application of a number of views is not limited to ones shown, like the 2 views and the four views, but numbers of views different from each other can be produced from one liquid crystal lens electrically driven by varying voltage conditions such that first and second substrates 100 and 200 have pitches difference from each other. And, it will be also possible that one view matches to one sub-pixel or one view matches to one pixel.

In this instance, the first and second electrodes 101a, 101b, 201a and 201b are transparent electrodes formed of a material that does not influence to light transmission. The first electrodes 101a, 101b and the second electrodes 201a and 201b can be formed to have fixed intervals and widths, or depending on the lens regions intended to produce, each of the first electrodes 101a, 101b and the second electrodes 201a and 201b can be formed to have different intervals and widths. In any case, since, at the time the different voltages are applied to the electrodes for producing the lens regions on a side of the substrate having the electrodes formed thereon, identical voltages are applied to a facing substrate, making the micro pattern electrodes on a side identical voltages are applied thereto not perceptible, there is no influence coming from the widths and intervals of the electrodes.

Though the display panel 300 is shown as R, G, B sub-pixels simply, the display panel 300 may be a flat display device, such as a liquid crystal display device LCD, an organic light emitting display device OLED, a plasma display panel PDP, a field emission display device FED, each having facing substrates and an array formed on each of the substrates.

In the meantime, the first electrodes 101a, 101b and the second electrodes 201a and 201b may be formed on one plane spaced from each other, or as shown, on different planes like the first electrode 101a and the second electrode 201a on the first and second substrates 100 and 200 and the first electrodes 101b and the second electrode 201b on the first and second insulating films 103 and 203, allocating the electrodes to other planes. In this instance, in the latter case, at the time the first electrodes 101a and 101b or the second electrodes 201a and 201b are formed, by providing an enough space between the first electrodes 101a and 101b or between the second electrodes 201a and 201b spaced on the same plane, taking place of a short between the first electrodes or the second electrodes adjacent to each other with a micro gap can be prevented. Or depending on cases, the first electrodes 101a and 101b and the second electrodes 201a and 201b may be formed densely on the same plane of the first substrate 100 or the second substrate 200 to occupy a surface thereof fully, almost.

In this instance, the first electrode at the center 0 of the first lens region L1 has the first voltage Vmin applied thereto, and the first electrodes positioned at the edge portion E of the lens regions L 1 have the highest voltage Vmax applied thereto. In this case, the voltages applied to the first electrodes 101a and 101b positioned between the center 0 and the edge portion E of the lens regions L1 have voltages between the threshold voltage Vmin and the (n)th voltage Vmax applied thereto, which becomes the higher as the lens regions L1 go from the center thereof toward the edge portion E the more. In the meantime, if the voltages are applied to the plurality of first electrodes 101a and 101b, the common voltage is applied to the second electrodes 201a and 201b for form a vertical electric field between the first electrodes 101a and 101b and the second electrodes 201a and 201b.

At the time of application of the voltages, a voltage difference between first electrodes 101a and 101b adjacent to each other are made to be below 1V for preventing a strong horizontal electric field from forming between the first electrodes 101a and 101b.

The first electrodes 101a and 101b are formed symmetry in left/right directions at the lens region L with respect to the edge portion E of the lens region. The first electrodes 101a and 101b are connected to relevant voltages sources Vmin, V1, V2, ..., Vmax through metal lines (not shown) at pad portions (At a non-display portion of the display panel 300) for having relevant voltages applied thereto.

In this instance, a lowest threshold voltage Vmin applied to the first electrode 101a or 101b at the center 0 of the lens region L is an AC square wave having about 1.4~2V peak value, and can be expressed with $$\pi\sqrt{\frac{K1}{\Delta\varepsilon\varepsilon_0}},$$

where $\Delta\in$ denotes liquid crystal dielectric anisotropy, K1 denotes an elastic modulus of a liquid crystal and $\in_0$ denotes free space dielectric. And, a highest voltage of the voltages applied to the first electrode 101a or 101b at the edge portion E of the lens region L is an AC square wave having about 2.5~10V peak value.

As described before, at the time the second lens region L2 is produced, the second lens region L2 is divided into a plurality of sub-regions and the voltages are applied to the sub-regions such that each of the sub-regions has a lens peak point.

The width of the lens region L is the pitch P, with P/2 from the center 0 of the lens region L to the edge portion E of the lens region L, showing that symmetric voltages are applied to the symmetric first electrodes 101a and 101b from the center 0 of the lens region L to the edge portion E of the lens region L.

On the first substrate 100 having the first electrodes 101a and 101b formed thereon and the second electrodes 201a and 201b, a first alignment film (not shown) and a second alignment film (not shown) are formed respectively. The first alignment film may be rubbed in a direction perpendicular or parallel to a length direction of the first electrodes 101a and 101b for making the liquid crystal lens electrically driven 1000 to function as a transmission layer at an initial state when no voltage is applied thereto. The rubbing direction of the second alignment film is perpendicular or anti-parallel to this. By this, the image transmitted to a lower side through the display panel under the liquid crystal lens electrically driven is transmitted to the watcher as it is.

The plurality of the first electrodes 101a and 101b and the second electrodes 201a and 201b have widths of 1~10 μm, and gaps of 1~10 μm between adjacent first electrodes 101a and 101b and second electrodes 201a and 201b. For an example, the pitch may vary in a range of 90~1000 μm, and the first electrodes 101a and 101b and the second electrodes 201a and 201b can be formed at each region in numbers of around 10 to over 100 depending on the widths and intervals of the first electrodes 101a and 101b and the second electrodes 201a and 201b.

In the meantime, though not shown, there may be a seal pattern (not shown) formed at a peripheral region (the non-display region including the pad portion) for supporting a space between the first and second substrates 100 and 200. Moreover, in order to form the liquid crystal lens electrically driven of an adequate phase, the liquid crystal layer 150 is formed to have an adequate thickness of about 15 μm. In order to make secure maintenance of the thickness of the liquid crystal layer 150, ball spacers or column spacers may be formed for supporting the cell gap between the first and second substrates 100 and 200, additionally. In this case, it is preferable that the spacers are formed at positioned which do not distort the phase of the liquid crystal lens electrically driven.

Figure 5:
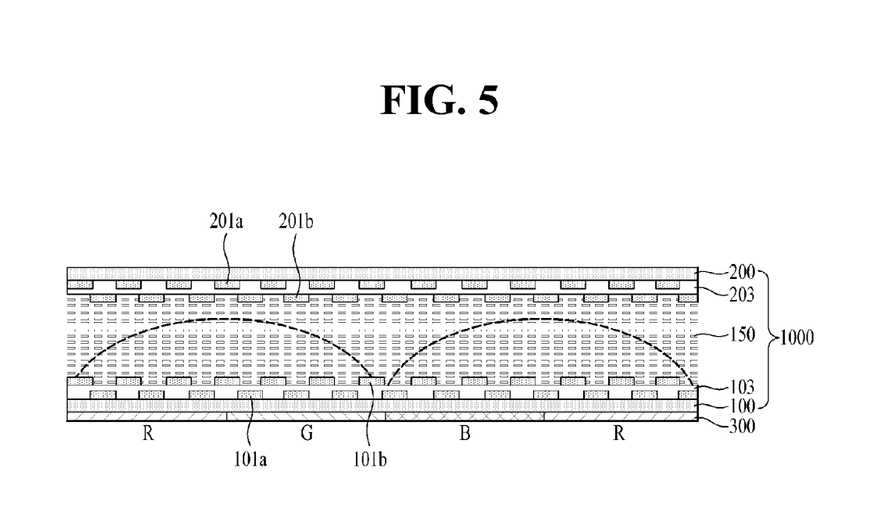
FIG. 5 illustrates a section of a case in which a liquid crystal lens electrically driven in accordance with a preferred embodiment of the present invention is used in two views.
Figure 6:
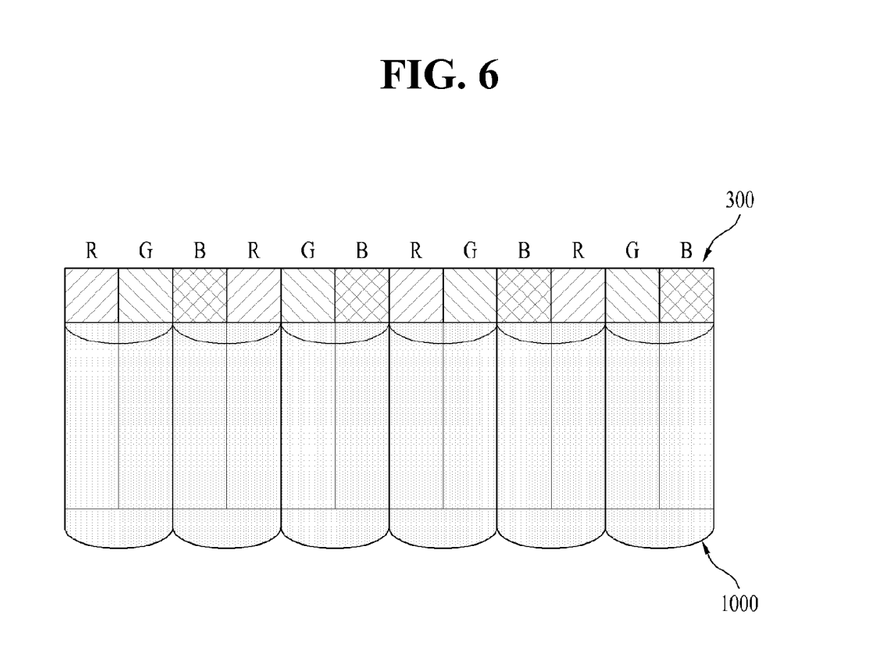
FIG. 6 illustrates a diagram showing a relation of matching between the liquid crystal lens electrically driven in FIG. 5 and a display panel.

FIG. 5 illustrates a section of a case in which a liquid crystal lens electrically driven in accordance with a preferred embodiment of the present invention is used in two views, and FIG. 6 illustrates a diagram showing a relation of matching between the liquid crystal lens electrically driven in FIG. 5 and a display panel.

Referring to FIGS. 5 and 6 illustrating the liquid crystal lens electrically driven used in two views, the lens is formed with respect to two sub-pixels of R and G or B and R of the display panel 300. As described before, FIGS. 5 and 6 illustrates a state in which different voltages are applied to the first electrodes on the first substrate symmetric with reference to the center of the lens region of the first electrodes and the common voltage is applied to the second electrodes on the second substrate.

Figure 7:
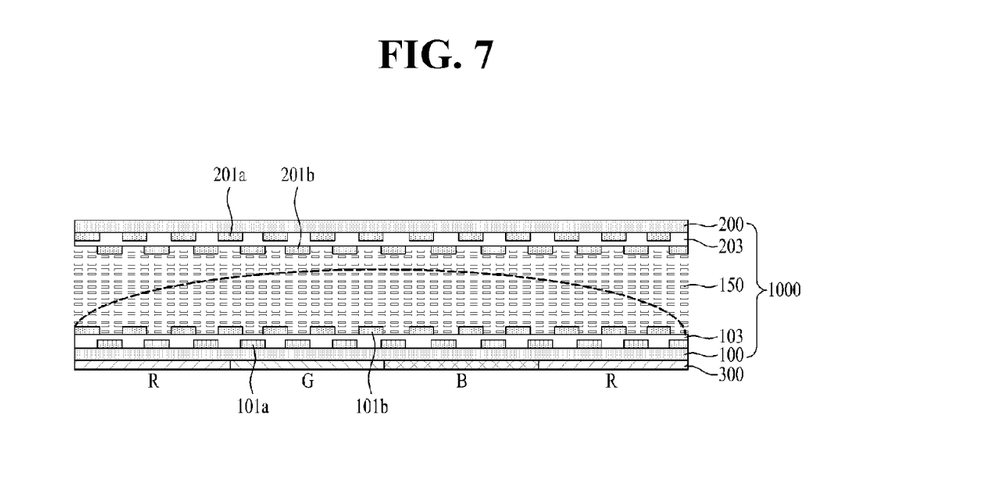
FIG. 7 illustrates a section of a case in which a liquid crystal lens electrically driven in accordance with a preferred embodiment of the present invention is used in four views.
Figure 8:
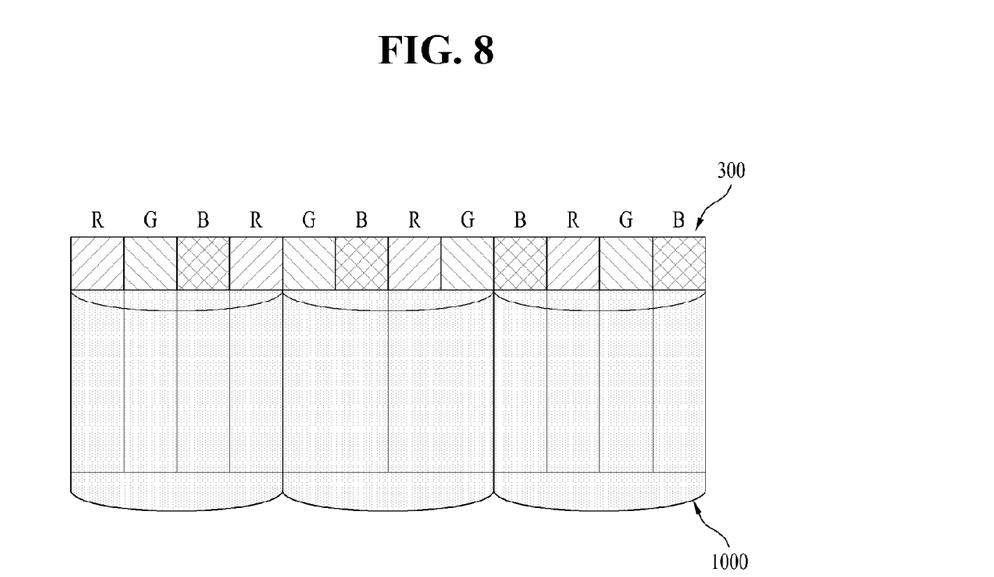
FIG. 8 illustrates a diagram showing a relation of matching between the liquid crystal lens electrically driven in FIG. 7 and a display panel.

FIG. 7 illustrates a section of a case in which a liquid crystal lens electrically driven in accordance with a preferred embodiment of the present invention is used in four views, and FIG. 8 illustrates a diagram showing a relation of matching between the liquid crystal lens electrically driven in FIG. 7 and a display panel.

Referring to FIGS. 7 and 8 illustrating the liquid crystal lens electrically driven used in four views, the lens is formed with respect to four sub-pixels of R, G, B and R of the display panel 300. As described before, different voltages are applied to the second electrodes on the second substrate symmetric with reference to the center of the lens region of the second electrodes. And, in order to adjust a cell gap height, the lens region is divided by using the Fresnel lens to form the lens at the liquid crystal layer having a thickness identical to the thickness of the liquid crystal layer required for two views.

The liquid crystal lens electrically driven 1000 having the display panel 300 on a lower side thereof enables to select a two dimensional image from the display panel 300 to be driven in two dimension or three dimension depending on whether the voltage source VS is driven or not. When the voltage source VS is turned off, the two dimensional image from the underlying display panel 300 is displayed as it is, and if it is intended to display the three dimensional image, relevant lens regions required for the three dimensional display is selected and relevant voltages are applied from the voltage source VS suitable to the lens regions.

In this instance, it is preferable that the first lens region has the pitch equivalent to two sub-pixels of the display panel and the second lens region has the pitch equivalent to three or more than three sub-pixels of the display panel. In this case, it is preferable that a number of sub-regions of the second lens region are fixed in proportion to square of a value obtained by dividing the pitch of the second lens region by the pitch of the first lens region.

As has been described, the liquid crystal lens electrically driven and the stereoscopic display device thereof of the present invention have the following advantages.

First, the liquid crystal lens electrically driven is formed to have a moderate parabolic lens shape of a vertical electric field between the second electrode on the upper substrate and the first electrodes by micro division of the first electrodes on the lower substrate for securing micro and secure profile of the liquid crystal lens electrically driven and applying different voltages to the first electrodes.

Second, different numbers of views can be produced with one liquid crystal lens electrically driven by forming the electrodes on both the upper substrate and the lower substrate to have micro division electrodes and forming pitch of the lens regions of the substrates different from one another. According to this, the user can feel a number of sub-pixels of the stereo 3D image differently, enabling to perceive a variety of stereo 3D images.

In this case, regarding a point a thickness of the liquid crystal layer increases with increase of numbers when numbers of views different from each other are matched, the different numbers of views can be produced to have the same liquid crystal layer thickness by dividing the lens region of relatively great number of views into a plurality of sub-regions and applying the Fresnel lens each having peak point to each of the sub-regions.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal lens electrically driven, comprising:
   first and second substrates arranged to face each other to have a plurality of first and second lens regions with pitches different from each other;
   a plurality of first electrodes respectively formed at the first lens regions of the first substrate in one direction;
   a plurality of second electrodes respectively formed at the second lens regions of the second substrate in one direction;
   a voltage source for generating:
   a first voltage group of voltages different from one another to be applied to the first electrodes positioned from a center to an edge portion of the first lens region;
   a second voltage group of voltages different from one another to be applied to the second electrodes positioned from a center to an edge portion of the second lens region; and
   a common voltage to be applied to the first voltage group or the second voltage group; and
   a liquid crystal layer filled between the first substrate and the second substrate,
   wherein the first voltage group comprises voltages which become higher as the first region goes from the center to the edge portion to be applied to the first electrodes, and
   wherein the second voltage group comprises voltages which become the higher as the second lens region goes from a peak point of a sub-region to a boundary of the sub-region to be applied to the second electrodes, such that each of a plurality of the sub-regions of the second lens region comprises the peak point.

2. The liquid crystal lens as claimed in claim 1, wherein, at the time each lens is produced at the first lens regions, the voltage source applies the first voltage group to the first electrodes and the common voltage to the second electrodes.

3. The liquid crystal lens as claimed in claim 1, wherein, at the time each lens is produced at the second lens regions, the voltage source applies the second voltage group to the second electrodes and the common voltage to the first electrodes.

4. The liquid crystal lens as claimed in claim 1, wherein the second lens region has a pitch greater than a pitch of the first lens region.

5. The liquid crystal lens as claimed in claim 1, wherein the first and second electrodes are transparent electrodes formed in the same direction.

6. A stereoscopic display device, comprising:
   a liquid crystal lens electrically driven, comprising:

first and second substrates arranged to face each other to have a plurality of first and second lens regions with pitches different from each other;

a plurality of first electrodes respectively formed at the first lens regions of the first substrate in one direction;

a plurality of second electrodes respectively formed at the second lens regions of the second substrate in one direction;

a voltage source for generating:

a first voltage group of voltages different from one another to be applied to the first electrodes positioned from a center to an edge portion of the first lens region;

a second voltage group of voltages different from one another to be applied to the second electrodes positioned from a center to an edge portion of the second lens region; and a common voltage to be applied to the first voltage group or the second voltage group; and a liquid crystal layer filled between the first substrate and the second substrate; and a display panel positioned on a lower side of the liquid crystal lens electrically driven for transmission of a two dimensional image, wherein the first voltage group comprises voltages which become the higher as the first region goes from the center to the edge portion to be applied to the first electrodes, and wherein the second voltage group comprises voltages which become higher as the second lens region goes from a peak point of a sub-region to a boundary of the sub-region to be applied to the second electrodes, such that each of a plurality of the sub-regions of the second lens region comprises the peak point.

7. The device as claimed in claim 6, wherein:

the two dimensional display is performed by cutting off the voltages applied to the first and second electrodes through the voltage source; and three dimensional display is performed by applying voltages different from one another to the first electrodes and the second electrodes through the voltage source.

8. The device as claimed in claim 6, wherein:

the first lens region has a pitch equivalent to two sub-pixels of the display panel; and the second lens region has a pitch equivalent to three or more than three sub-pixels.

9. The device as claimed in claim 8, wherein a number of sub-regions of the second lens region are fixed in proportion to square of a value obtained by dividing the pitch of the second lens region by the pitch of the first lens region.

* * * * *